US012288542B2

(12) United States Patent
Xu

(10) Patent No.: US 12,288,542 B2
(45) Date of Patent: Apr. 29, 2025

(54) METHOD FOR ACCOMPANIMENT PURITY CLASS EVALUATION AND RELATED DEVICES

(71) Applicant: Tencent Music Entertainment Technology (Shenzhen) Co., Ltd., Guangdong (CN)

(72) Inventor: Dong Xu, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 766 days.

(21) Appl. No.: 17/630,423

(22) PCT Filed: Jun. 29, 2019

(86) PCT No.: PCT/CN2019/093942
§ 371 (c)(1),
(2) Date: Jan. 26, 2022

(87) PCT Pub. No.: WO2020/237769
PCT Pub. Date: Dec. 3, 2020

(65) Prior Publication Data
US 2022/0284874 A1 Sep. 8, 2022

(30) Foreign Application Priority Data
May 30, 2019 (CN) ......................... 201910461862.7

(51) Int. Cl.
*G10H 1/36* (2006.01)
*G10H 1/00* (2006.01)

(52) U.S. Cl.
CPC ........... *G10H 1/361* (2013.01); *G10H 1/0008* (2013.01); *G10H 2210/005* (2013.01); *G10H 2210/031* (2013.01); *G10H 2250/311* (2013.01)

(58) Field of Classification Search
CPC ................. G10H 1/361; G10H 1/0008; G10H 2210/005; G10H 2210/31; G10H 2250/311
(Continued)

(56) References Cited

U.S. PATENT DOCUMENTS 10,008,190 B1 * 6/2018 Elson ..................... G11B 27/34
2017/0178681 A1 * 6/2017 Keal ..................... G10L 15/285
(Continued)

FOREIGN PATENT DOCUMENTS

CN 101515454 A 8/2009
CN 105070301 A 11/2015
(Continued)

OTHER PUBLICATIONS

CNIPA, International Search Report for International Patent Application No. PCT/CN2019/093942, Feb. 24, 2020, 5 pages.
(Continued)

*Primary Examiner* — Christina M Schreiber
(74) *Attorney, Agent, or Firm* — IP Spring

(57) ABSTRACT

A method for accompaniment purity class evaluation and related devices are provided. Multiple first accompaniment data and a label corresponding to each of the multiple first accompaniment data are obtained, the label being used to indicate that corresponding first accompaniment data is pure instrumental accompaniment data or instrumental accompaniment data with background noise. An audio feature of each of the multiple first accompaniment data is extracted. Model training is performed according to the audio feature of each of the multiple first accompaniment data and the label corresponding to each of the multiple first accompaniment data, to obtain a neural network model for accompaniment purity class evaluation, a model parameter of the neural network model being determined according to an association
(Continued)

relationship between the audio feature of each of the multiple first accompaniment data and the label corresponding to each of the multiple first accompaniment data.

20 Claims, 8 Drawing Sheets

(58) Field of Classification Search
USPC ............................................................ 84/634
See application file for complete search history.

(56) References Cited

U.S. PATENT DOCUMENTS

| | | | | |
|---|---|---|---|---|
| 2022/0215821 | A1* | 7/2022 | Zheng | G10H 1/0008 |
| 2022/0277040 | A1* | 9/2022 | Xu | G10H 1/36 |
| 2022/0284874 | A1* | 9/2022 | Xu | G10H 1/0008 |

FOREIGN PATENT DOCUMENTS

| | | | | | |
|---|---|---|---|---|---|
| CN | 105405448 | A | | 3/2016 | |
| CN | 105593936 | A | | 5/2016 | |
| CN | 105657535 | A | | 6/2016 | |
| CN | 106356070 | A | | 1/2017 | |
| CN | 106548784 | A | | 3/2017 | |
| CN | 108182227 | A | | 6/2018 | |
| CN | 108320756 | A | | 7/2018 | |
| CN | 108417228 | A | | 8/2018 | |
| CN | 108597535 | A | | 9/2018 | |
| CN | 108877783 | A | | 11/2018 | |
| CN | 109065072 | A | * | 12/2018 | G10L 25/30 |
| CN | 109147804 | A | | 1/2019 | |
| CN | 109166593 | A | | 1/2019 | |
| CN | 109545191 | A | | 3/2019 | |
| CN | 109712641 | A | | 5/2019 | |
| DE | 4430628 | A1 | | 3/1996 | |
| JP | H04157499 | A | | 5/1992 | |
| WO | WO-2006132596 | A1 | * | 12/2006 | G06F 17/30743 |

OTHER PUBLICATIONS

CNIPA, First Office Action for Chinese Patent Application No. CN201910461862.7, Oct. 23, 2020, 12 pages.

Zhang, Xiaofu et al., "Reviewing the Production of the Accompanying Tape," China Modern Educational Equipment, Sep. 30, 2008 (Sep. 30, 2008), 4 pages.

CNIPA, Written Opinion for International Patent Application No. PCT/CN2019/093942, Feb. 24, 2020, 9 pages.

* cited by examiner

METHOD FOR ACCOMPANIMENT PURITY CLASS EVALUATION AND RELATED DEVICES

CROSS-REFERENCE TO RELATED APPLICATIONS

This application is the U.S. National Stage filing under 35 U.S.C. § 371 of International Patent Application No. PCT/CN2019/093942, filed on Jun. 29, 2019, which in turn claims priority under PCT Article 8 and/or 35 U.S.C. § 119(a) to Chinese Patent Application No. 201910461862.7, filed on May 30, 2019, which is incorporated herein by reference in its entirety.

TECHNICAL FIELD

The disclosure relates to the field of computer technology, and more particularly to a method for accompaniment purity class evaluation and related devices.

BACKGROUND

With improvement of living standards and scientific and technological level, people have been able to sing whenever and wherever they want through mobile terminals (such as a mobile phone), which may require an accompaniment to provide a user with singing support. If an accompaniment of a song sung is an original accompaniment, the original accompaniment has high purity class, giving people a beautiful experience. However, if the accompaniment of the song sung is a vocal cut accompaniment, the vocal cut accompaniment has low purity class and contains more background noise, which may greatly reduce a user experience.

Reasons for generating the vocal cut accompaniment include the following. On the one hand, many old songs do not have corresponding original accompaniments because of old release ages, or it is difficult to obtain original accompaniments corresponding to new songs with newer release ages. On the other hand, because of continuous development of audio technology, some original songs can be processed by people through the audio technology, so as to obtain vocal cut accompaniments. However, the vocal cut accompaniment processed through the audio technology still has more background noise, which makes a subjective listening feeling of the vocal cut accompaniment to be worse than that of the original accompaniment.

At present, the vocal cut accompaniment has appeared in a large number in network, and music content providers mainly rely on a manual marking method for distinguishing the vocal cut accompaniment, which has low efficiency and a low accuracy rate, and may consume a lot of labor costs. At present, how to efficiently and accurately distinguish the vocal cut accompaniment from the original accompaniment is still a severe technical challenge.

SUMMARY

According to a first aspect, a method for accompaniment purity class evaluation is provided in implementations of the disclosure. The method includes the following. Multiple first accompaniment data and a label corresponding to each of the multiple first accompaniment data are obtained, and the label corresponding to each of the multiple first accompaniment data is used to indicate that corresponding first accompaniment data is pure instrumental accompaniment data or instrumental accompaniment data with background noise. An audio feature of each of the multiple first accompaniment data is extracted. Model training is performed according to the audio feature of each of the multiple first accompaniment data and the label corresponding to each of the multiple first accompaniment data, to obtain a neural network model for accompaniment purity class evaluation, and a model parameter of the neural network model is determined according to an association relationship between the audio feature of each of the multiple first accompaniment data and the label corresponding to each of the multiple first accompaniment data.

In some implementations, the method further includes the following. Before the audio feature of each of the multiple first accompaniment data is extracted, each of the multiple first accompaniment data is adjusted, to match a playback duration of each of the multiple first accompaniment data with a preset playback duration, and each of the multiple first accompaniment data is normalized, to match a sound intensity of each of the multiple first accompaniment data with a preset sound intensity.

In some implementations, the method further includes the following. Before model training is performed according to the audio feature of each of the multiple first accompaniment data and the label corresponding to each of the multiple first accompaniment data, the audio feature of each of the multiple first accompaniment data is processed according to a Z-score algorithm, to standardize the audio feature of each of the multiple first accompaniment data, and the standardized audio feature of each of the multiple first accompaniment data is matched with a normal distribution.

In some implementations, the method further includes the following. After the neural network model for accompaniment purity class evaluation is obtained, an audio feature of each of multiple second accompaniment data and a label corresponding to each of the multiple second accompaniment data are obtained; the audio feature of each of the multiple second accompaniment data is input into the neural network model, to obtain an evaluation result of each of the multiple second accompaniment data; an accuracy rate of the neural network model is obtained according to a difference between the evaluation result of each of the multiple second accompaniment data and the label corresponding to each of the multiple second accompaniment data; and the model parameter is adjusted to retrain the neural network model on condition that the accuracy rate of the neural network model is less than a preset threshold, until the accuracy rate of the neural network model is greater than or equal to the preset threshold and a change magnitude of the model parameter is less than or equal to a preset magnitude.

In some implementations, the audio feature includes any one or any combination of: a mel frequency cepstrum coefficient (MFCC) feature, a relative spectra perceptual linear predictive (RASTA-PLP) feature, a spectral entropy feature, and a perceptual linear predictive (PLP) feature.

In some implementations, the method further includes the following. Data to-be-tested is obtained, and the data to-be-tested includes accompaniment data. An audio feature of the accompaniment data is extracted. The audio feature is input into the neural network model, to obtain a purity class evaluation result of the accompaniment data, the evaluation result is used to indicate that the data to-be-tested is pure instrumental accompaniment data or instrumental accompaniment data with background noise.

In some implementations, the method further includes the following. Before the audio feature of the accompaniment data is extracted, the accompaniment data is adjusted, to match a playback duration of the accompaniment data with a preset playback duration, and the accompaniment data is normalized, to match a sound intensity of the accompaniment data with a preset sound intensity.

In some implementations, the method further includes the following. Before the audio feature is input into the neural network model, the audio feature of the accompaniment data is processed according to the Z-score algorithm, to standardize the audio feature of the accompaniment data, and the standardized audio feature of the accompaniment data is matched with a normal distribution.

In some implementations, the method further includes the following. After the purity class evaluation result of the accompaniment data is obtained, the purity class evaluation result is determined as the pure instrumental accompaniment data on condition that the accompaniment data has purity class greater than or equal to a preset threshold, and the purity class evaluation result is determined as the instrumental accompaniment data with background noise on condition that the data to-be-tested has purity class less than the preset threshold.

According to a second aspect, an electronic device is provided. The electronic device includes a processor and a memory. The processor is coupled with the memory, the memory is configured to store computer programs, the computer programs include program instructions, and the processor is configured to invoke the program instructions to perform the method of any of the implementations in the first aspect, and/or, the method of any of the implementations in the second aspect.

According to a third aspect, a non-transitory computer readable storage medium is provided. The non-transitory computer readable storage medium is configured to store computer programs, and the computer programs include program instructions which, when executed by a processor, are operable with the processor to perform the method of any of the implementations in the first aspect, and/or, the method of any of the implementations in the second aspect.

BRIEF DESCRIPTION OF THE DRAWINGS

In order to describe technical solutions in implementations of the disclosure more clearly, the following will give a brief introduction to the accompanying drawings required for describing implementations. Apparently, the accompanying drawings hereinafter described are some implementations of the disclosure. Based on these drawings, those of ordinary skill in the art can also obtain other drawings without creative effort.

DETAILED DESCRIPTION

The following will describe technical solutions of implementations of the disclosure with reference to the accompanying drawings. Apparently, implementations described herein are some implementations of the disclosure, rather than all implementations, of the disclosure. Based on the implementations of the disclosure described herein, all other implementations obtained by those of ordinary skill in the art without creative effort shall fall within the protection scope of the disclosure.

The terms "include", "comprise", and "have" as well as variations used in the specification, the claims, and the accompany drawings of the present disclosure are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

For ease of understanding of the disclosure, the following will describe an architecture related in implementations of the disclosure.

Figure 1:
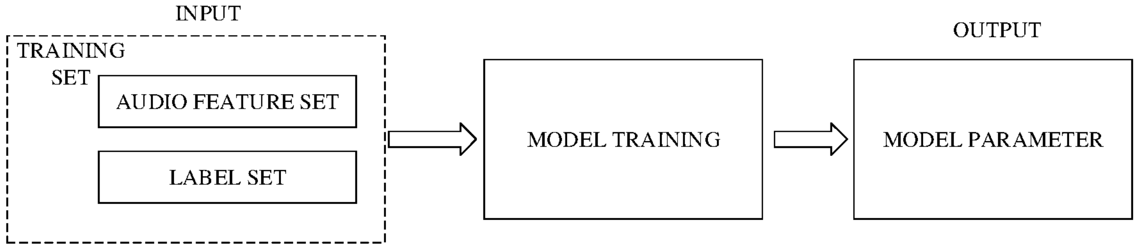
FIG. 1 is a schematic architecture diagram illustrating a training process of a neural network model provided in implementations of the disclosure.

Referring to FIG. 1, which is a schematic architecture diagram illustrating a training process of a neural network model provided in implementations of the disclosure, as illustrated in FIG. 1, a server inputs an audio feature set and a label set corresponding to the audio feature set in a training set into the neural network model to perform model training, to obtain a model parameter of the neural network model. The audio feature set in the training set can be extracted from multiple original accompaniment data and multiple vocal cut accompaniment data. The original accompaniment data is pure instrumental accompaniment data. The vocal cut accompaniment data is obtained by removing a vocal part from an original song through a noise reduction software but still partially has background noise. The label set is used to indicate that a corresponding audio feature is from the original accompaniment data or the vocal cut accompaniment data.

Figure 2:
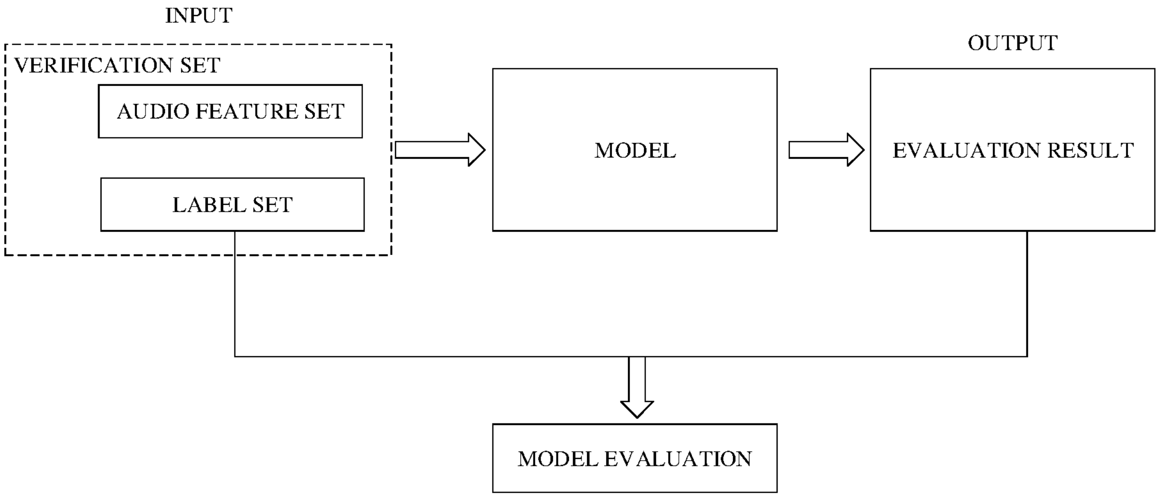
FIG. 2 is a schematic architecture diagram illustrating a verification process of a neural network model provided in implementations of the disclosure.

Referring to FIG. 2, which is a schematic architecture diagram illustrating a verification process of a neural network model provided in implementations of the disclosure, as illustrated in FIG. 2, the server inputs an audio feature set in a verification set into the neural network model that is trained through the training set in FIG. 1, to obtain an accompaniment purity class evaluation result of each audio feature in the audio feature set. The accompaniment purity class evaluation result of each audio feature is compared with a label corresponding to each audio feature, to obtain an accuracy rate of the neural network model for the verification set, so that whether the training of the neural network model is completed is evaluated according to the accuracy rate. The audio feature set in the verification set also can be extracted from the original accompaniment data and the vocal cut accompaniment data. For description of the original accompaniment data, the vocal cut accompaniment data, and the label set, reference can be made to the description above, which will not be repeated herein for sake of simplicity.

Figure 3:
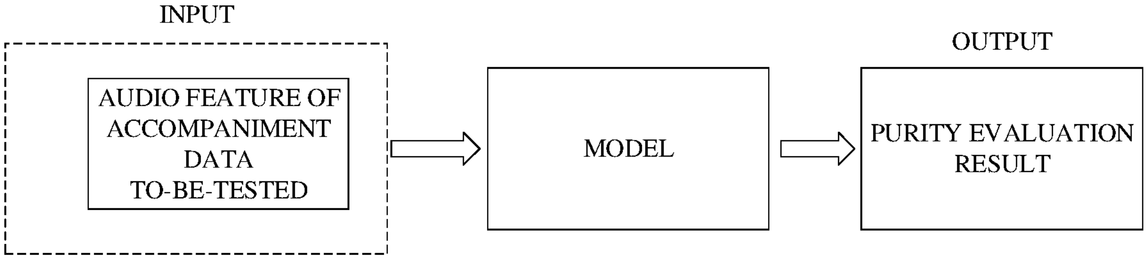
FIG. 3 is a schematic architecture diagram illustrating neural network model-based accompaniment purity class evaluation provided in implementations of the disclosure.

Referring to FIG. 3, which is a schematic architecture diagram illustrating neural network model-based accompaniment purity class evaluation provided in implementations of the disclosure, after model training in FIG. 1 and model evaluation in FIG. 2, the server obtains the trained neural network model. Therefore, if accompaniment data to-be-tested needs to be evaluated, the server inputs an obtained audio feature of the accompaniment data to-be-tested into the trained neural network model, to obtain a purity class evaluation result of the accompaniment data through evaluation for the audio feature of the accompaniment data to-be-tested by the neural network model.

It may be noted that firstly, in order to facilitate description for implementations of the disclosure, an executive subject in implementations of the disclosure is called a server.

The following will describe a method for accompaniment purity class evaluation provided in implementations of the disclosure in detail in conjunction with the accompanying drawings, which can efficiently and accurately distinguish a vocal cut accompaniment and an original accompaniment.

Figure 4:
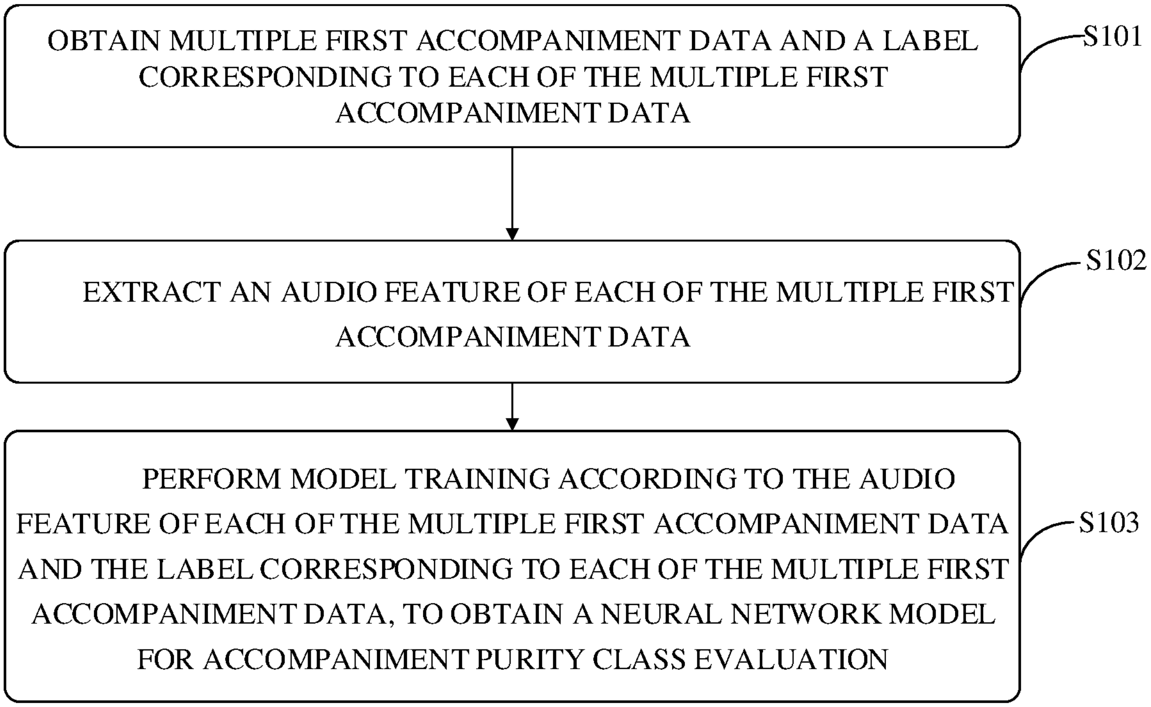
FIG. 4 is a schematic flow chart illustrating a method for accompaniment purity class evaluation provided in implementations of the disclosure.

Referring to FIG. 4, which is a schematic flow chart illustrating a method for accompaniment purity class evaluation provided in implementations of the disclosure, the method includes but is not limited to the following.

At S101, multiple first accompaniment data and a label corresponding to each of the multiple first accompaniment data are obtained.

In implementations of the disclosure, the multiple first accompaniment data include original accompaniment data and vocal cut accompaniment data. Accordingly, the label corresponding to each of the multiple first accompaniment data may include a label of the original accompaniment data and a label of the vocal cut accompaniment data, for example, the label of the original accompaniment data may be set to 1, and the label of the vocal cut accompaniment data may be set to 0. It may be noted that, the original accompaniment data may be pure instrumental accompaniment data, and the vocal cut accompaniment data may be instrumental accompaniment data with background noise. In some specific implementations, the vocal cut accompaniment data may be obtained by removing a vocal part from an original song through specific noise reduction technology. Generally, sound quality of a vocal cut accompaniment is relatively poor, a score part of music is relatively vague and unclear, and only a rough melody can be heard.

In some implementations, the multiple first accompaniment data and the label corresponding to each of the multiple first accompaniment data can be obtained as follows. A server can obtain the multiple first accompaniment data and accordingly the label corresponding to each of the multiple first accompaniment data from a local music database, and bind each of the multiple first accompaniment data to the label corresponding to each of the multiple first accompaniment data. The server also can receive the multiple first accompaniment data and the label corresponding to each of the multiple first accompaniment data transmitted from other servers through a wired or wireless manner. Specifically, the wireless manner may include one or any combination of communication protocols, such as a transmission control protocol (TCP), a user datagram protocol (UDP), a hyper text transfer protocol (HTTP), and a file transfer protocol (FTP). In addition, the server also can obtain the multiple first accompaniment data and the label corresponding to each of the multiple first accompaniment data from the network through a network crawler. It can be understood that, the examples above are only for example, and the specific manner for obtaining the multiple first accompaniment data and the label corresponding to each of the multiple first accompaniment data is not limited in the disclosure.

In implementations of the disclosure, an audio format of the first accompaniment data may be any one of audio formats such as moving picture experts group audio layer 3 (MP3), free lossless audio codec (FLAC), wave (WAV), or oggvorbis (OGG). In addition, a sound channel of the first accompaniment data may be any one of mono-channel, dual-channel, or multi-channel. It can be understood that, the examples above are only for example, and the audio format and the number of sound channels of the first accompaniment data are not limited in the disclosure.

At S102, an audio feature of each of the multiple first accompaniment data is extracted.

In some implementations, the extracted audio feature of each of the multiple first accompaniment data includes any one or any combination of: a mel frequency cepstrum coefficient (MFCC) feature, a relative spectra perceptual linear predictive (RASTA-PLP) feature, a spectral entropy feature, and a perceptual linear predictive (PLP) feature. It can be understood that, extraction for the above audio features from audio data can be realized through feature extraction algorithms corresponding to some open source algorithm libraries, which are well-known methods for practitioners in an audio field. However, it may be understood that, there are extremely numerous algorithms for audio feature extraction in the open source algorithm library, and different audio features have different representational meanings. For example, an audio features represents a timbre of the audio data, and an audio feature can represent a pitch of the audio data. In the disclosure, the extracted audio feature is required to represent purity class of accompaniment data. In other words, a feature represented by the extracted audio feature can clearly distinguish the pure instrumental accompaniment data and the accompaniment data with background noise. A feature representing purity class of accompaniment data can be preferably obtained through one or multiple combinations of the audio features described above. In addition, it can be understood that, the audio feature of each of the multiple first accompaniment data extracted in the disclosure also may be other audio features, which will not be limited herein.

At S103, model training is performed according to the audio feature of each of the multiple first accompaniment data and the label corresponding to each of the multiple first accompaniment data, to obtain a neural network model for accompaniment purity class evaluation.

Figure 5:
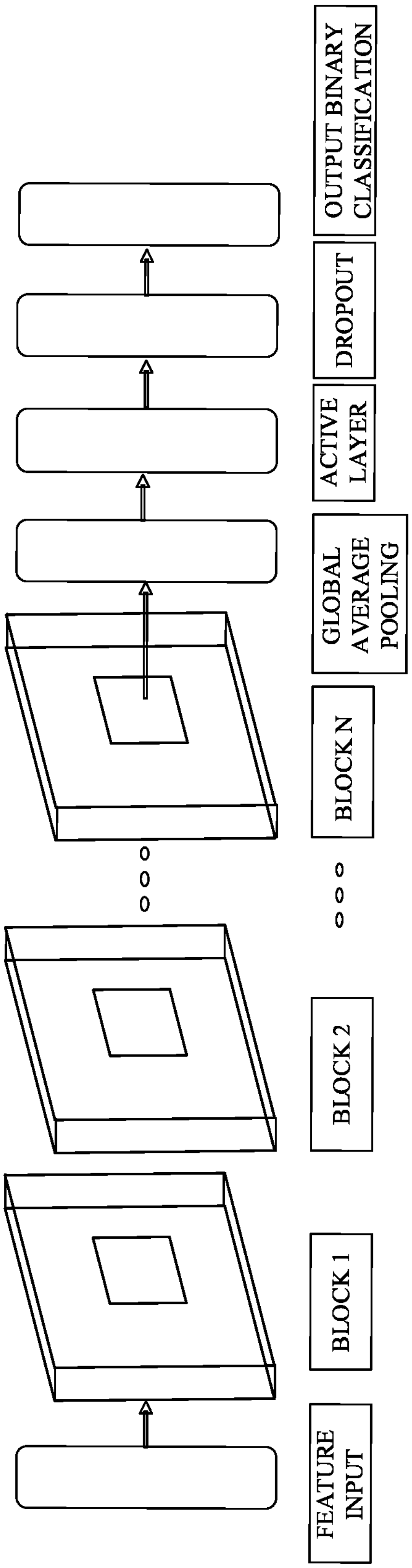
FIG. 5 is a schematic structural diagram illustrating a neural network model provided in implementations of the disclosure.

In some implementations, the neural network model is established and is a convolutional neural network model, which can refer to FIG. 5 which is a schematic structural diagram illustrating a convolutional neural network model provided in implementations of the disclosure. The convolutional neural network model includes an input layer, an interlayer, a global average pooling layer, an active layer, a dropout layer, an output layer, and so on. Input of the input layer may be the audio feature of each of the multiple first accompaniment data and the label corresponding to each of the multiple first accompaniment data. The interlayer may include N sub-layers, and each sub-layer includes at least one convolutional layer and at least one pooling layer. The convolutional layer is used to perform local sampling on the audio feature of the first accompaniment data, to obtain feature information of different dimensions of the audio feature. The pooling layer is used to perform down-sampling on the feature information of different dimensions of the audio feature, thereby performing dimension reduction on the feature information, and thus avoiding overfitting of the convolutional neural network model. The global average pooling layer is used to perform dimension reduction on feature information output from the N sub-layers of the interlayer, to avoid overfitting of the convolutional neural network model. The active layer is used to add a nonlinear structure of the convolutional neural network model. The dropout layer is used to randomly disconnect an input neuron according to a certain probability every time a parameter is updated in a training process, to avoid overfitting of the convolutional neural network model. The output layer is used to output a classification result of the convolutional neural network model.

In some implementations, the convolutional neural network model also may be other convolutional neural network models, such as LeNet, AlexNet, GoogLeNet, visual geometry group neural network (VGGNet), residual neural network (ResNet), or a neural network model with various types, in which the type of the convolutional neural network model will not be limited herein.

In implementations of the disclosure, after the convolutional neural network model is established, the server performs model training on the convolutional neural network model according to the audio feature of each of the multiple first accompaniment data and the label corresponding to each of the multiple first accompaniment data, to obtain the neural network model for accompaniment purity class evaluation. A model parameter of the neural network model is determined according to an association relationship between the audio feature of each of the multiple first accompaniment data and the label corresponding to each of the multiple first accompaniment data. Specifically, the server packages the audio features of the multiple first accompaniment data into an audio feature set and packages the labels corresponding to each of the multiple first accompaniment data into a label set. Each audio feature in the audio feature set is in one-to-one correspondence with each label in the label set, an order of each audio feature in the audio feature set may be the same as that of a label corresponding to the audio feature in the label set, and each audio feature and a label corresponding to the audio feature constitute a training sample. The server inputs the audio feature set and the label set into the convolutional neural network model to perform model training, such that the convolutional neural network model learns and fits the model parameter according to the audio feature set and the label set. The model parameter is determined according to an association relationship between each audio feature in the feature set and each label in the label set.

In implementations of the disclosure, the server firstly obtains the multiple first accompaniment data and the label corresponding to each of the multiple first accompaniment data, extracts the audio feature of each of the multiple obtained first accompaniment data, and performs model training according to the extracted audio feature of each of the multiple first accompaniment data and the label corresponding to each of the multiple first accompaniment data, to obtain the neural network model that can be used for accompaniment purity class evaluation. Compared with a conventional scheme for accompaniment purity class recognition based on a manual selection manner, the neural network model can be used for accompaniment purity class evaluation in this scheme, to distinguish that the accompaniment is original accompaniment data of the pure instrumental accompaniment data or vocal cut accompaniment data with background noise. When purity class of a large amount of accompaniment data needs to be recognized, it is more economical in implementation with this scheme, and efficiency and an accuracy rate for recognition are higher.

Figure 6:
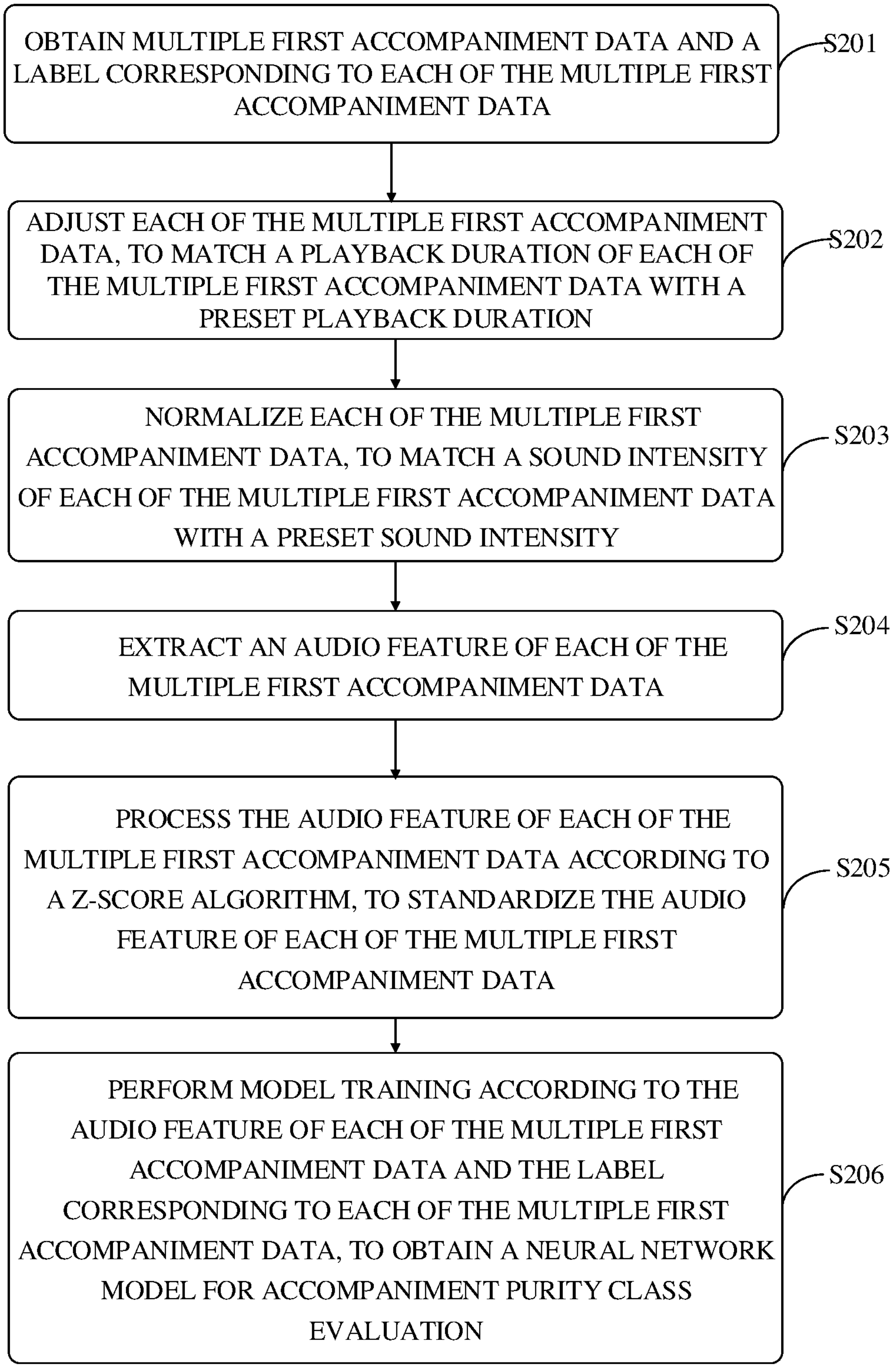
FIG. 6 is a schematic flow chart illustrating a method for accompaniment purity class evaluation provided in other implementations of the disclosure.

Referring to FIG. 6, which is a schematic flow chart illustrating a method for accompaniment purity class evaluation provided in other implementations of the disclosure, the method includes but is not limited to the following.

At S201, multiple first accompaniment data and a label corresponding to each of the multiple first accompaniment data are obtained.

In some implementations, for description of the multiple first accompaniment data and the label corresponding to each of the multiple first accompaniment data at S201, reference can be made to the description at S101 of the method implementation illustrated in FIG. 4, which will not be repeated herein for sake of simplicity.

In some implementations, after the multiple first accompaniment data and the label corresponding to each of the multiple first accompaniment data are obtained, the server classifies the multiple first accompaniment data into pure instrumental accompaniment data or instrumental accompaniment data with background noise according to the label corresponding to each of the multiple first accompaniment data. The pure instrumental accompaniment data is classified into a positive sample training data set, a positive sample verification data set, and a positive sample test data set according to a preset ratio. The instrumental accompaniment data with background noise is classified into a negative sample training data set, a negative sample verification data set, and a negative sample test data set according to the same preset ratio. Specifically, for example, the first accompaniment data includes 50,000 positive samples (the pure instrumental accompaniment data) and 50,000 negative samples (the instrumental accompaniment data with background noise), the server randomly samples from the 50,000 positive samples according to a ratio of 8:1:1, to obtain the positive sample training data set, the positive sample verification data set, and the positive sample test data set. In the same way, the server randomly samples from the 50,000 negative samples according to the ratio of 8:1:1, to obtain the negative sample training data set, the negative sample verification data set, and the negative sample test data set.

At S202, each of the multiple first accompaniment data is adjusted, to match a playback duration of each of the multiple first accompaniment data with a preset playback duration.

In some implementations, the server performs audio decoding on each of the multiple first accompaniment data, to obtain sound waveform data of each of the multiple first accompaniment data, and then removes mute parts at a beginning and an end of each of the multiple first accompaniment data. Since the vocal cut accompaniment (i.e., the instrumental accompaniment data with background noise described above) can be obtained through removing the vocal part from the original song with audio technology, the original song usually has the pure instrumental accompaniment at the beginning without the vocal part, so most vocal cut accompaniments have better sound quality at beginnings. It can be known that through big data statistics, sound quality of the vocal cut accompaniment usually starts to get worse after 30 seconds when the mute part at the beginning is removed. In order to make the neural network model learn audio features of the vocal cut accompaniment pertinently, in implementations of the disclosure, besides removing the mute parts at the beginning and the end of each of the multiple first accompaniment data, audio data within 30 seconds after the mute part at the beginning is also removed. Then start to read data within a remaining part in length of 100 seconds, for data within a remaining part in length exceeding 100 seconds, give up a former part but not a later part, and for data within a remaining part in length less than 100 seconds, perform zero padding at the end of the remaining part. The aims of the above operations are to: extract a core part of each of the multiple first accompaniment data to make the neural network model learn pertinently; and make a playback duration of each of the multiple first accompaniment data same, to exclude other factors affecting the learning direction of the neural network model.

At S203, each of the multiple first accompaniment data is normalized, to match a sound intensity of each of the multiple first accompaniment data with a preset sound intensity.

In some implementations, since different accompaniments are recorded through different audio devices, even if a same playback volume is set in a same terminal device, volumes of different accompaniments are respectively different. In order to avoid that model parameters of the neural network model are different resulted with difference of introduced sound intensities, in implementations of the disclosure, the server adjusts each of the multiple first accompaniment data, to match the playback duration of each of the multiple first accompaniment data with the preset playback duration, and then normalizes a magnitude of each of the multiple adjusted first accompaniment data in a time domain and normalizes energy of each of the multiple adjusted first accompaniment data in a frequency domain, such that the sound intensity of each of the multiple first accompaniment data is unified and matched with the preset sound intensity.

At S204, an audio feature of each of the multiple first accompaniment data is extracted.

In implementations of the disclosure, for extraction of the audio feature of each of the multiple first accompaniment data at S204, reference can be made to the description at S102 of the method implementation illustrated in FIG. 4, which will not be repeated herein for sake of simplicity.

In some implementations, the audio feature of each of the multiple first accompaniment data is stored in a matrix form. Specifically, the storage data format may include a numpy format, a h5 format, and the like, which will not be limited herein.

At S205, the audio feature of each of the multiple first accompaniment data is processed according to a Z-score algorithm, to standardize the audio feature of each of the multiple first accompaniment data.

In some implementations, data standardization is performed on the audio feature of each of the multiple first accompaniment data according to formula (1), such that outlier audio features beyond a value range can be converged within the value range. The formula (1) is a formula of the Z-score algorithm, X' represents new data and corresponds to standardized first accompaniment data herein, X represents original data and corresponds to an audio feature of the first accompaniment data herein, μ represents an average value of the original data and corresponds to a feature average value of the audio feature of each of the multiple first accompaniment data herein, b represents a standard deviation and corresponds to a standard deviation of the audio feature of each of the multiple first accompaniment data herein.

$$X' = \frac{X - \mu}{b} \tag{1}$$

The audio feature of each of the multiple first accompaniment data is matched with a standard normal distribution after the audio feature of each of the multiple first accompaniment data is standardized through the formula (1) above.

At S206, model training is performed according to the audio feature of each of the multiple first accompaniment data and the label corresponding to each of the multiple first accompaniment data, to obtain a neural network model for accompaniment purity class evaluation.

In implementations of the disclosure, for description at S206, reference can be made to the description at S103 of the method implementation illustrated in FIG. 4, which will not be repeated herein for sake of simplicity.

In some implementations, after the neural network model for accompaniment purity class evaluation is obtained, obtain an audio feature set corresponding to a positive sample verification data set, an audio feature set corresponding to a negative sample verification data set, a label set corresponding to the positive sample verification data set, and a label set corresponding to the negative sample verification data set. Each data in the positive sample verification data set is an original accompaniment (pure instrumental accompaniment), and each data in the negative sample verification data set is a vocal cut accompaniment (instrumental accompaniment with background noise). The server inputs the audio feature set corresponding to the positive sample verification data set and the audio feature set corresponding to the negative sample verification data set into the neural network model, to obtain an evaluation result of each accompaniment data, where the evaluation result is a purity class score of each accompaniment data. The server obtains an accuracy rate of the neural network model according to a difference between the evaluation result of each accompaniment data and a label corresponding to each second accompaniment data. The model parameter is adjusted to retrain the neural network model on condition that the accuracy rate of the neural network model is less than a preset threshold, until the accuracy rate of the neural network model is greater than or equal to the preset threshold and a change magnitude of the model parameter is less than or equal to a preset magnitude. The model parameter includes output of a loss function, a learning rate of the model, and the like.

In other implementations, after training for the neural network is stopped, obtain an audio feature set corresponding to a positive sample test data set, a label set corresponding to the positive sample test data set, an audio feature set corresponding to a negative sample test data set, and a label set corresponding to the negative sample test data set, and evaluate the neural network model based on the audio feature set and label set corresponding to the positive sample test data set as well as the audio feature set and label set corresponding to the negative sample test data set, to evaluate whether the neural network model has an ability for accompaniment purity class evaluation.

In implementations of the disclosure, the server firstly obtains the multiple first accompaniment data and the label corresponding to each of the multiple first accompaniment data and unifies the playback duration and playback sound intensity of each of the multiple first accompaniment data into the preset playback duration and the preset playback sound intensity, to avoid other factors affecting training for the neural network model. The audio feature of each of the multiple unified first accompaniment data is extracted and standardized, to match the normal distribution. Training is performed on the neural network model according to each audio feature obtained through the above operations and a label corresponding to each audio feature, to obtain the neural network model that can be used for accompaniment purity class evaluation. Through implementations of the disclosure, the accuracy rate of the neural network model for accompaniment purity class recognition can be further improved.

Figure 7:
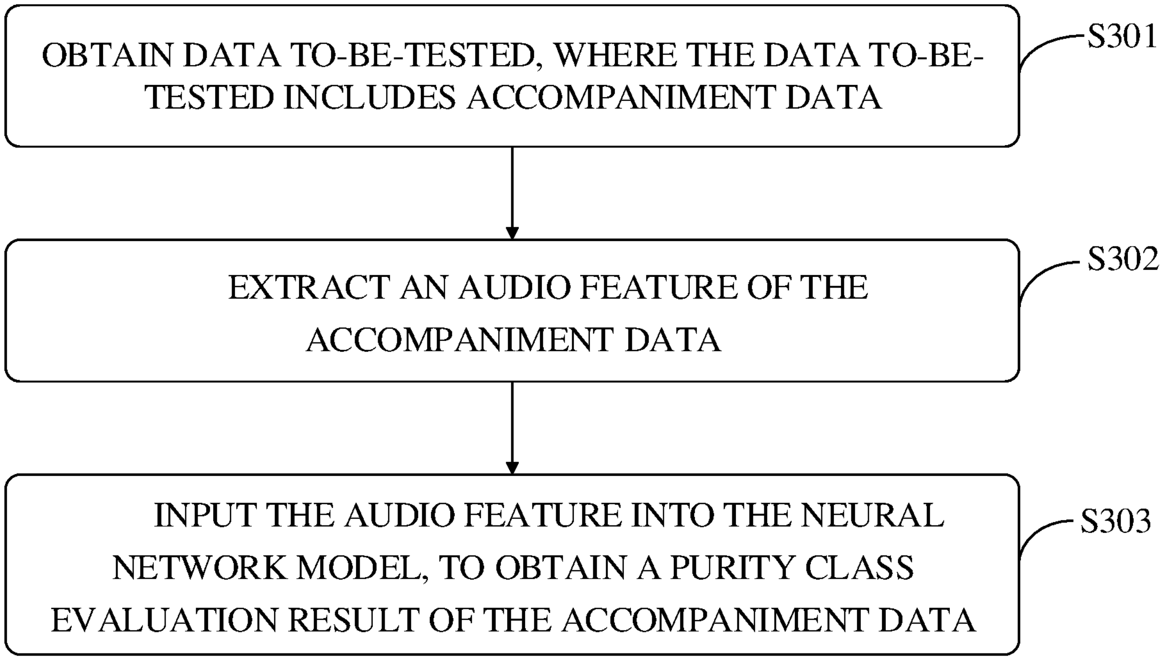
FIG. 7 is a schematic flow chart illustrating a method for accompaniment purity class evaluation provided in other implementations of the disclosure.

Referring to FIG. 7, which is a schematic flow chart illustrating a method for accompaniment purity class evaluation provided in other implementations of the disclosure, the method includes but is not limited to the following. The method for accompaniment purity class evaluation corresponding to FIG. 7 describes obtaining a purity class evaluation result of accompaniment data included in data to-be-tested with a trained neural network model. The method for accompaniment purity class evaluation corresponding to FIG. 7 can be performed based on the above-mentioned implementations of obtaining of a neural network model for accompaniment purity class evaluation or be performed separately.

At S301, data to-be-tested is obtained, and the data to-be-tested includes accompaniment data.

In implementations of the disclosure, the data to-be-tested includes the accompaniment data, and the data to-be-tested can be obtained through the following manners. A server can obtain the data to-be-tested from a local music database. The server also can receive accompaniment data to-be-tested transmitted from other terminal devices through a wired or wireless manner. Specifically, the wireless manner may include one or any combination of communication protocols, such as a TCP, a UDP, a HTTP, and a FTP.

In implementations of the disclosure, an audio format of the data to-be-tested may be any one of audio formats such as MP3, FLAC, WAV, or OGG. In addition, a sound channel of the data to-be-tested may be any one of mono-channel, dual-channel, or multi-channel. It can be understood that, the examples above are only for example, and the audio format and the number of sound channels of the data to-be-tested are not limited in the disclosure.

At S302, an audio feature of the accompaniment data is extracted.

In some implementations, the extracted audio feature of the accompaniment data includes any one or any combination of: a MFCC feature, a RASTA-PLP feature, a spectral entropy feature, and a PLP feature. It may be understood that, the type of the extracted audio feature of the accompaniment data is the same as that of the extracted audio feature of each of the multiple first accompaniment data at S102 of the method implementation illustrated in FIG. 4 and at S204 of the method implementation illustrated in FIG. 6. For example, the MFCC feature, the RASTA-PLP feature, the spectral entropy feature, and the PLP feature of the first accompaniment data are extracted in the method implementations illustrated in FIG. 4 and FIG. 6, and accordingly, the above four types of the audio feature of the accompaniment data also may be extracted herein.

In some implementations, before the audio feature of the accompaniment data is extracted, the server adjusts the accompaniment data, to match a playback duration of the accompaniment data with a preset playback duration, and further normalizes the accompaniment data, to match a sound intensity of the accompaniment data with a preset sound intensity.

In some implementations, the server performs audio decoding on the accompaniment data, to obtain sound waveform data of the accompaniment data, and then removes mute parts at a beginning and an end of the accompaniment data. It can be known that through big data statistics, sound quality of the vocal cut accompaniment usually starts to get worse after 30 seconds when the mute part at the beginning part is removed. In order to make the neural network model learn audio features of the vocal cut accompaniment pertinently, in implementations of the disclosure, besides removing the mute parts at the beginning and the end of each of the multiple first accompaniment data, audio data within 30 seconds after the mute part at the beginning is also removed. Then start to read data within a remaining part in length of 100 seconds, for data within a remaining part in length exceeding 100 seconds, give up a former part but not a later part, and for data within a remaining part in length less than 100 seconds, perform zero padding at the end of the remaining part.

In some implementations, since different accompaniments are recorded through different audio devices, even if a same playback volume is set in a same terminal device, volumes of different accompaniments are respectively different. In order to avoid that model parameters of the neural network model are different resulted with difference of introduced sound intensities, in implementations of the disclosure, the server adjusts each of the multiple first accompaniment data, to match the playback duration of each of the multiple first accompaniment data with the preset playback duration, and then normalizes a magnitude of each of the multiple adjusted first accompaniment data in a time domain and normalizes energy of each of the multiple adjusted first accompaniment data in a frequency domain, such that the sound intensity of each of the multiple first accompaniment data is unified and matched with the preset sound intensity.

In some implementations, since the extracted audio feature of the accompaniment data includes sub-features of different dimensions, for example, the audio feature of the accompaniment data includes 500 sub-features, a maximum value and a minimum value in the 500 sub-features cannot be determined, and the 500 sub-features include sub-features beyond a preset value range. Therefore, before the audio feature of the accompaniment data is input into the neural network model, data standardization is performed on the audio feature of the accompaniment data according to the formula (1), such that outlier audio features beyond the value range can be converged within the value range, thereby each sub-feature in the audio feature of the accompaniment data being matched with the normal distribution.

At S303, the audio feature is input into the neural network model, to obtain a purity class evaluation result of the accompaniment data.

In implementations of the disclosure, the evaluation result is used to indicate that the data to-be-tested is pure instrumental accompaniment data or instrumental accompaniment data with background noise, the neural network model is obtained through training according to multiple samples, the multiple samples include an audio feature of each of multiple accompaniment data and a label corresponding to each of the multiple accompaniment data, a model parameter of the neural network model is determined according to an association relationship between the audio feature of each of the multiple accompaniment data and the label corresponding to each of the multiple accompaniment data.

In some implementations, for the training method for the neural network model, reference can be made to the description of the method implementation illustrated in FIG. 4 or FIG. 6, which will not be repeated herein for sake of simplicity.

In some implementations, the method further includes the following. After the purity class evaluation result of the accompaniment data is obtained, the purity class evaluation result is determined as the pure instrumental accompaniment data on condition that the accompaniment data has purity class greater than or equal to a preset threshold, and the purity class evaluation result is determined as the instrumental accompaniment data with background noise on condition that the data to-be-tested has purity class less than the preset threshold. Specifically, for example, if the preset threshold is 0.9, the accompaniment data can be determined as the pure instrumental accompaniment data when a purity class score obtained from the neural network model is greater than or equal to 0.9, and the accompaniment data can be determined as the instrumental accompaniment data with background noise when a purity class score obtained from the neural network model is less than 0.9.

In some implementations, after the purity class evaluation result of the accompaniment data is obtained, the server transmits the purity class evaluation result to a corresponding terminal device, such that the terminal device can display the purity class evaluation result in a display apparatus of the terminal device, or the server stores the purity class evaluation result into a corresponding disk.

In implementations of the disclosure, the server firstly obtains the data to-be-tested, extracts the audio feature of the accompaniment data, and inputs the extracted audio feature into the trained neural network model for accompaniment purity class evaluation, such that the purity class evaluation result of the accompaniment data to-be-tested can be obtained, and the accompaniment data to-be-tested can be determined as the pure instrumental accompaniment data or the instrumental accompaniment data with background noise through the purity class evaluation result. Through the above implementations, the purity class of the accompaniment data to-be-tested is distinguished through the neural network model. Compared with a manual manner for accompaniment purity class distinction, the scheme has higher efficiency and a lower cost in implementation and has higher accuracy and precision for accompaniment purity class distinction.

The related methods in implementations of the disclosure are described above, and based on a same inventive concept, the following will describe a related apparatus in implementations of the disclosure.

Figure 8:
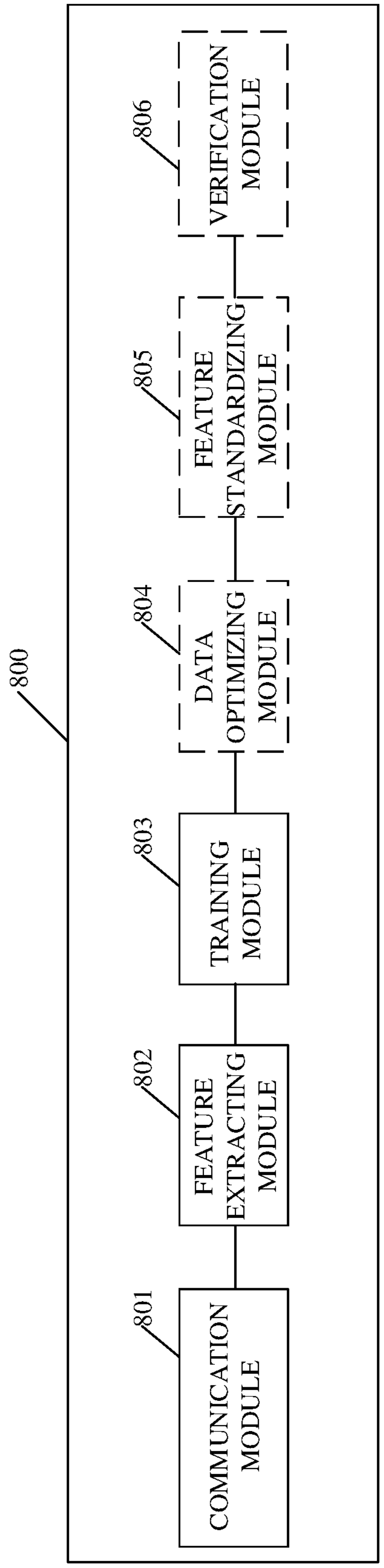
FIG. 8 is a schematic structural diagram illustrating an apparatus for accompaniment purity class evaluation provided in other implementations of the disclosure.

Referring to FIG. 8, which is a schematic structural diagram illustrating an apparatus for accompaniment purity class evaluation provided in other implementations of the disclosure, as illustrated in FIG. 8, the apparatus for accompaniment purity class evaluation 800 includes a communication module 801, a feature extracting module 802, and a training module 803.

The communication module 801 is configured to obtain multiple first accompaniment data and a label corresponding to each of the multiple first accompaniment data, and the label corresponding to each of the multiple first accompaniment data is used to indicate that corresponding first accompaniment data is pure instrumental accompaniment data or instrumental accompaniment data with background noise.

The feature extracting module 802 is configured to extract an audio feature of each of the multiple first accompaniment data.

The training module 803 is configured to perform model training according to the audio feature of each of the multiple first accompaniment data and the label corresponding to each of the multiple first accompaniment data, to obtain a neural network model for accompaniment purity class evaluation, and a model parameter of the neural network model is determined according to an association relationship between the audio feature of each of the multiple first accompaniment data and the label corresponding to each of the multiple first accompaniment data.

In a possible implementation, the apparatus further includes a data optimizing module 804. The data optimizing module 804 is configured to adjust each of the multiple first accompaniment data, to match a playback duration of each of the multiple first accompaniment data with a preset playback duration, and normalize each of the multiple first accompaniment data, to match a sound intensity of each of the multiple first accompaniment data with a preset sound intensity.

In a possible implementation, the apparatus further includes a feature standardizing module 805. The feature standardizing module 805 is configured to, before model training is performed according to the audio feature of each of the multiple first accompaniment data and the label corresponding to each of the multiple first accompaniment data, process the audio feature of each of the multiple first accompaniment data according to a Z-score algorithm, to standardize the audio feature of each of the multiple first accompaniment data, and the standardized audio feature of each of the multiple first accompaniment data is matched with a normal distribution.

In a possible implementation, the apparatus further includes a verification module 806. The verification module 806 is configured to: obtain an audio feature of each of multiple second accompaniment data and a label corresponding to each of the multiple second accompaniment data; input the audio feature of each of the multiple second accompaniment data into the neural network model, to obtain an evaluation result of each of the multiple second accompaniment data; obtain an accuracy rate of the neural network model according to a difference between the evaluation result of each of the multiple second accompaniment data and the label corresponding to each of the multiple second accompaniment data; and adjust the model parameter to retrain the neural network model on condition that the accuracy rate of the neural network model is less than a preset threshold, until the accuracy rate of the neural network model is greater than or equal to the preset threshold and a change magnitude of the model parameter is less than or equal to a preset magnitude.

In a possible implementation, the audio feature includes any one or any combination of: a MFCC feature, a RASTA-PLP feature, a spectral entropy feature, and a PLP feature.

In implementations of the disclosure, the apparatus for accompaniment purity class evaluation 800 firstly obtains the multiple first accompaniment data and the label corresponding to each of the multiple first accompaniment data, extracts the audio feature of each of the multiple obtained first accompaniment data, and performs model training according to the extracted audio feature of each of the multiple first accompaniment data and the label corresponding to each of the multiple first accompaniment data, to obtain the neural network model that can be used for accompaniment purity class evaluation. Compared with a conventional scheme for accompaniment purity class recognition based on a manual selection manner, the neural network model can be used for accompaniment purity class evaluation in this scheme, to distinguish that the accompaniment is original accompaniment data of the pure instrumental accompaniment data or vocal cut accompaniment data with background noise. When purity class of a large amount of accompaniment data needs to be recognized, it is more economical in implementation with this scheme, and efficiency and an accuracy rate for recognition are higher.

Figure 9:
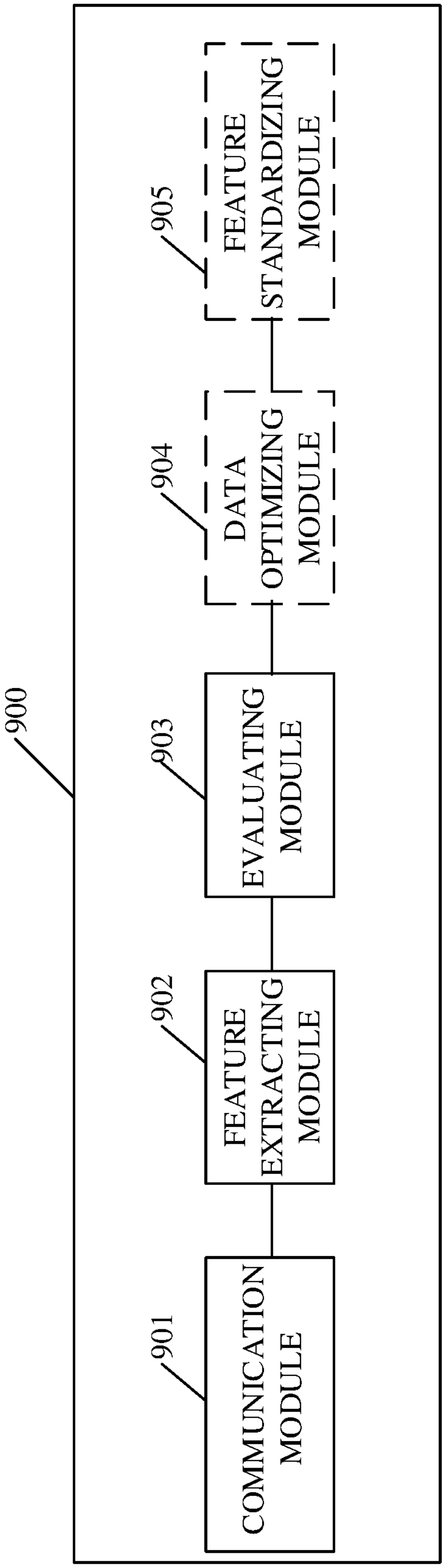
FIG. 9 is a schematic structural diagram illustrating an apparatus for accompaniment purity class evaluation provided in other implementations of the disclosure.

Referring to FIG. 9, which is a schematic structural diagram illustrating an apparatus for accompaniment purity class evaluation provided in other implementations of the disclosure, as illustrated in FIG. 9, the apparatus for accompaniment purity class evaluation 900 includes a communication module 901, a feature extracting module 902, and an evaluation module 903.

The communication module 901 is configured to obtain data to-be-tested, and the data to-be-tested includes accompaniment data.

The feature extracting module 902 is configured to extract an audio feature of the accompaniment data.

The evaluation module 903 is configured to input the audio feature into a neural network model, to obtain a purity class evaluation result of the accompaniment data. The evaluation result is used to indicate that the data to-be-tested is pure instrumental accompaniment data or instrumental accompaniment data with background noise. The neural network model is obtained through training according to multiple samples. The multiple samples include an audio feature of each of multiple accompaniment data and a label corresponding to each of the multiple accompaniment data. A model parameter of the neural network model is determined according to an association relationship between the audio feature of each of the multiple accompaniment data and the label corresponding to each of the multiple accompaniment data.

In a possible implementation, the apparatus 900 further includes a data optimizing module 904. The data optimizing module 904 is configured to, before the audio feature of the accompaniment data is extracted, adjust the accompaniment data, to match a playback duration of the accompaniment data with a preset playback duration, and normalize the accompaniment data, to match a sound intensity of the accompaniment data with a preset sound intensity.

In a possible implementation, the apparatus 900 further includes a feature standardizing module 905. the feature standardizing module 905 is configured to, before the audio feature is input into the neural network model, process the audio feature of the accompaniment data according to a Z-score algorithm, to standardize the audio feature of the accompaniment data, and the standardized audio feature of the accompaniment data is matched with a normal distribution.

In a possible implementation, the evaluation module 903 is further configured to determine the purity class evaluation result as the pure instrumental accompaniment data on condition that the accompaniment data has purity class greater than or equal to a preset threshold, and to determine the purity class evaluation result as the instrumental accompaniment data with background noise on condition that the data to-be-tested has purity class less than the preset threshold.

In implementations of the disclosure, the apparatus for purity class evaluation 900 firstly obtains the data to-be-tested, extracts the audio feature of the accompaniment data, and inputs the extracted audio feature into the trained neural network model for accompaniment purity class evaluation, such that the purity class evaluation result of the accompaniment data to-be-tested can be obtained, and the accompaniment data to-be-tested can be determined as the pure instrumental accompaniment data or the instrumental accompaniment data with background noise through the purity class evaluation result. Through the above implementations, the purity class of the accompaniment data to-be-tested is distinguished through the neural network model. Compared with a manual manner for accompaniment purity class distinction, the scheme has higher efficiency and a lower cost in implementation and has higher accuracy and precision for accompaniment purity class distinction. It is to be noted that, the apparatus for accompaniment purity class evaluation described in the device implementation of the disclosure is presented in the form of functional units. The term “module” used herein should be understood as the broadest meaning as possible, and an object for implementing functions defined by each “module” may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 10:
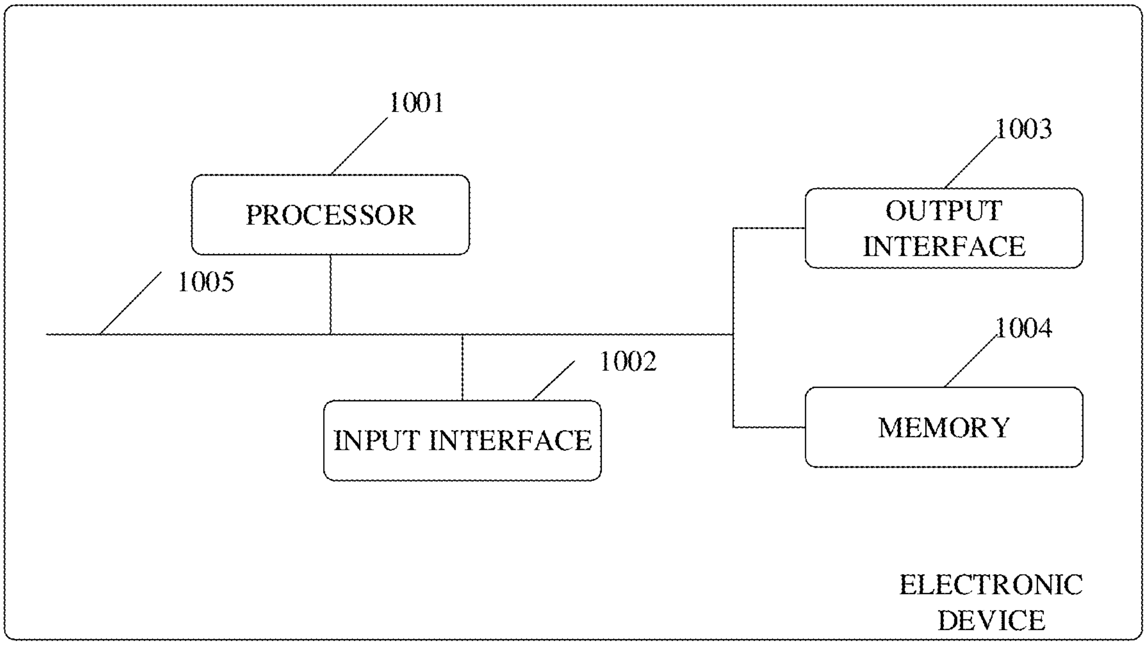
FIG. 10 is a schematic block diagram illustrating an electronic device hardware provided in implementations of the disclosure.

Referring to FIG. 10, which is a block diagram illustrating an electronic device provided in implementations of the disclosure. The electronic device may be a server. The server includes a processor 1001, and a memory configured to store instructions which are operable with a processor. The processor is configured to execute the methods and operations described in the method implementations illustrated in FIG. 4, FIG. 6, or FIG. 7.

In a possible implementation, the processor also may include one or more input interface 1002, one or more output interface 1003, and a memory 1004.

The processor 1001, the input interface 1002, the output interface 1003, and the memory 1004 are coupled with each other via a bus 1005. The memory 1004 is configured to store instructions. The processor 1001 is configured to execute the instructions stored in the memory 1004. The input interface 1002 is configured to receive data, such as the first accompaniment data in the method implementations illustrated in FIG. 4 or FIG. 6, the label corresponding to each of the multiple first accompaniment data, and the data to-be-tested in the method implementation illustrated in FIG. 7. The output interface 1003 is configured to output data, such as the purity class evaluation result in the method implementation illustrated in FIG. 7.

The processor 1001 is configured to invoke the program instructions to execute the methods and operations related with the processor of the server in the method implementations illustrated in FIG. 4, FIG. 6, or FIG. 7.

It can be understood that, in implementations of the disclosure, the processor 1001 may be a central processing unit (CPU), the processor may also be a general-purpose processor, a digital signal processor (DSP), an application specific integrated circuit (ASIC), a field programmable gate array (FPGA), or other programmable logic devices, discrete gates or transistor logic devices, or discrete hardware components. The general purpose processor may be a microprocessor, or any conventional processors or the like.

The memory 1004 may include a read-only memory (ROM) and a random access memory (RAM) and provide instructions and data to the processor 1001. Part of the memory 1004 may further include a non-volatile RAM. For example, the memory 1004 also may store information on interface type.

In implementations of the disclosure, a computer-readable storage medium is further provided. The computer-readable storage medium may be an internal storage unit of the terminal device of any of the foregoing implementations, such as a hard disk or a memory of the terminal device. The computer-readable storage medium may also be an external storage device of the terminal device, such as a plug-in hard disk, a smart media card (SMC), a secure digital (SD) card, a flash card, and the like that are provided on the terminal device. In addition, the computer-readable storage medium may also include both the internal storage unit of the terminal device and the external storage device of the terminal device. The computer-readable storage medium is configured to store computer programs and other programs and data required by the terminal device. The computer-readable storage medium can be further configured to temporarily store data that has been or is to be outputted.

Those of ordinary skill in the art will appreciate that units and algorithmic operations of various examples described in connection with implementations herein can be implemented by electronic hardware, by computer software, or by a combination of computer software and electronic hardware. In order to clearly explain interchangeability of hardware and software, in the above description, configurations and operations of each example have been generally described according to functions. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the apparatus and method for accompaniment purity class evaluation disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations herein may be integrated into one processing unit or may be presented as a number of physically separated units, and two or more units may be integrated into one. The integrated unit may take the form of hardware or a software functional unit.

If the integrated units are implemented as software functional units and sold or used as standalone products, they may be stored in a non-transitory computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, the apparatus for hotel management, a network device, etc. to execute some or all operations of the methods described in various implementations. The above storage medium may include various kinds of media that can store program codes, such as a universal serial bus (USB) flash disk, a mobile hard drive, a ROM, a RAM, a magnetic disk, or an optical disk.

The foregoing implementations are merely some implementations of the disclosure. The protection scope of the disclosure is not limited thereto. Those skilled in the art can easily think of various equivalent modifications or substitutions within the technical scope disclosed in the disclosure, and these modifications or substitutions shall be fall in the scope of protection of the disclosure. Therefore, the protection scope of the disclosure shall be subject to the protection scope of the claims.

What is claimed is:

1. A method for accompaniment purity class evaluation, comprising:

obtaining a plurality of first accompaniment data and a label corresponding to each of the plurality of first accompaniment data, the label corresponding to each of the plurality of first accompaniment data being used to indicate that corresponding first accompaniment data is pure instrumental accompaniment data or instrumental accompaniment data with background noise;

extracting an audio feature of each of the plurality of first accompaniment data; and performing model training according to the audio feature of each of the plurality of first accompaniment data and the label corresponding to each of the plurality of first accompaniment data, to obtain a neural network model for accompaniment purity class evaluation, a model parameter of the neural network model being determined according to an association relationship between the audio feature of each of the plurality of first accompaniment data and the label corresponding to each of the plurality of first accompaniment data.

2. The method of claim 1, further comprising:

before extracting the audio feature of each of the plurality of first accompaniment data, adjusting each of the plurality of first accompaniment data, to match a playback duration of each of the plurality of first accompaniment data with a preset playback duration; and normalizing each of the plurality of first accompaniment data, to match a sound intensity of each of the plurality of first accompaniment data with a preset sound intensity.

3. The method of claim 1, further comprising:

before performing model training according to the audio feature of each of the plurality of first accompaniment data and the label corresponding to each of the plurality of first accompaniment data, processing the audio feature of each of the plurality of first accompaniment data according to a Z-score algorithm, to standardize the audio feature of each of the plurality of first accompaniment data, the standardized audio feature of each of the plurality of first accompaniment data being matched with a normal distribution.

4. The method of claim 1, further comprising: after obtaining the neural network model for accompaniment purity class evaluation, obtaining an audio feature of each of a plurality of second accompaniment data and a label corresponding to each of the plurality of second accompaniment data; inputting the audio feature of each of the plurality of second accompaniment data into the neural network model, to obtain an evaluation result of each of the plurality of second accompaniment data; obtaining an accuracy rate of the neural network model according to a difference between the evaluation result of each of the plurality of second accompaniment data and the label corresponding to each of the plurality of second accompaniment data; and adjusting the model parameter to retrain the neural network model on condition that the accuracy rate of the neural network model is less than a preset threshold, until the accuracy rate of the neural network model is greater than or equal to the preset threshold and a change magnitude of the model parameter is less than or equal to a preset magnitude.

5. The method of claim 1, wherein the audio feature comprises any one or any combination of: a mel frequency cepstrum coefficient (MFCC) feature, a relative spectra perceptual linear predictive (RASTA-PLP) feature, a spectral entropy feature, and a perceptual linear predictive (PLP) feature.

6. The method of claim 1, further comprising: obtaining data to-be-tested, the data to-be-tested comprising accompaniment data; extracting an audio feature of the accompaniment data; and inputting the audio feature into the neural network model, to obtain a purity class evaluation result of the accompaniment data, the evaluation result being used to indicate that the data to-be-tested is pure instrumental accompaniment data or instrumental accompaniment data with background noise.

7. The method of claim 6, further comprising: before extracting the audio feature of the accompaniment data, adjusting the accompaniment data, to match a playback duration of the accompaniment data with a preset playback duration; and normalizing the accompaniment data, to match a sound intensity of the accompaniment data with a preset sound intensity.

8. The method of claim 6, further comprising: before inputting the audio feature into the neural network model, processing the audio feature of the accompaniment data according to a Z-score algorithm, to standardize the audio feature of the accompaniment data, the standardized audio feature of the accompaniment data being matched with a normal distribution.

9. The method of claim 6, further comprising: after obtaining the purity class evaluation result of the accompaniment data, determining the purity class evaluation result as the pure instrumental accompaniment data on condition that the accompaniment data has purity class greater than or equal to a preset threshold; and determining the purity class evaluation result as the instrumental accompaniment data with background noise on condition that the data to-be-tested has purity class less than the preset threshold.

10. An electronic device, comprising a processor and a memory, wherein the processor is coupled with the memory, the memory is configured to store computer programs, the computer programs comprise program instructions, and the processor is configured to invoke the program instructions to: obtain a plurality of first accompaniment data and a label corresponding to each of the plurality of first accompaniment data, the label corresponding to each of the plurality of first accompaniment data being used to indicate that corresponding first accompaniment data is pure instrumental accompaniment data or instrumental accompaniment data with background noise; extract an audio feature of each of the plurality of first accompaniment data; and perform model training according to the audio feature of each of the plurality of first accompaniment data and the label corresponding to each of the plurality of first accompaniment data, to obtain a neural network model for accompaniment purity class evaluation, a model parameter of the neural network model being determined according to an association relationship between the audio feature of each of the plurality of first accompaniment data and the label corresponding to each of the plurality of first accompaniment data.

11. The electronic device of claim 10, wherein the processor is further configured to invoke the program instructions to: before extracting the audio feature of each of the plurality of first accompaniment data, adjust each of the plurality of first accompaniment data, to match a playback duration of each of the plurality of first accompaniment data with a preset playback duration; and normalize each of the plurality of first accompaniment data, to match a sound intensity of each of the plurality of first accompaniment data with a preset sound intensity.

12. The electronic device of claim 10, wherein the processor is further configured to invoke the program instructions to: before performing model training according to the audio feature of each of the plurality of first accompaniment data and the label corresponding to each of the plurality of first accompaniment data, process the audio feature of each of the plurality of first accompaniment data according to a Z-score algorithm, to standardize the audio feature of each of the plurality of first accompaniment data, the standardized audio feature of each of the plurality of first accompaniment data being matched with a normal distribution.

13. The electronic device of claim 10, wherein the processor is further configured to invoke the program instructions to: after obtaining the neural network model for accompaniment purity class evaluation, obtain an audio feature of each of a plurality of second accompaniment data and a label corresponding to each of the plurality of second accompaniment data; input the audio feature of each of the plurality of second accompaniment data into the neural network model, to obtain an evaluation result of each of the plurality of second accompaniment data;

obtain an accuracy rate of the neural network model according to a difference between the evaluation result of each of the plurality of second accompaniment data and the label corresponding to each of the plurality of second accompaniment data; and adjust the model parameter to retrain the neural network model on condition that the accuracy rate of the neural network model is less than a preset threshold, until the accuracy rate of the neural network model is greater than or equal to the preset threshold and a change magnitude of the model parameter is less than or equal to a preset magnitude.

14. The electronic device of claim 10, wherein the audio feature comprises any one or any combination of: a mel frequency cepstrum coefficient (MFCC) feature, a relative spectra perceptual linear predictive (RASTA-PLP) feature, a spectral entropy feature, and a perceptual linear predictive (PLP) feature.

15. The electronic device of claim 10, wherein the processor is further configured to invoke the program instructions to:

obtain data to-be-tested, the data to-be-tested comprising accompaniment data;

extract an audio feature of the accompaniment data; and input the audio feature into the neural network model, to obtain a purity class evaluation result of the accompaniment data, the evaluation result being used to indicate that the data to-be-tested is pure instrumental accompaniment data or instrumental accompaniment data with background noise.

16. The electronic device of claim 15, wherein the processor is further configured to invoke the program instructions to:

before extracting the audio feature of the accompaniment data, adjust the accompaniment data, to match a playback duration of the accompaniment data with a preset playback duration; and normalize the accompaniment data, to match a sound intensity of the accompaniment data with a preset sound intensity.

17. The electronic device of claim 15, wherein the processor is further configured to invoke the program instructions to:

before inputting the audio feature into the neural network model, process the audio feature of the accompaniment data according to a Z-score algorithm, to standardize the audio feature of the accompaniment data, the standardized audio feature of the accompaniment data being matched with a normal distribution.

18. The electronic device of claim 15, wherein the processor is further configured to invoke the program instructions to:

after obtaining the purity class evaluation result of the accompaniment data, determine the purity class evaluation result as the pure instrumental accompaniment data on condition that the accompaniment data has purity class greater than or equal to a preset threshold; and determine the purity class evaluation result as the instrumental accompaniment data with background noise on condition that the data to-be-tested has purity class less than the preset threshold.

19. A non-transitory computer readable storage medium, wherein the non-transitory computer readable storage medium is configured to store computer programs, the computer programs comprise program instructions which, when executed by a processor, are operable with the processor to:

obtain data to-be-tested, the data to-be-tested comprising accompaniment data;

extract an audio feature of the accompaniment data; and input the audio feature into a neural network model, to obtain a purity class evaluation result of the accompaniment data, the evaluation result being used to indicate that the data to-be-tested is pure instrumental accompaniment data or instrumental accompaniment data with background noise, the neural network model being obtained through training according to a plurality of samples, the plurality of samples comprising an audio feature of each of a plurality of accompaniment data and a label corresponding to each of the plurality of accompaniment data, a model parameter of the neural network model being determined according to an association relationship between the audio feature of each of the plurality of accompaniment data and the label corresponding to each of the plurality of accompaniment data.

20. The non-transitory computer readable storage medium of claim 19, wherein the program instructions are further operable with the processor to:

before extracting the audio feature of the accompaniment data, adjust the accompaniment data, to match a playback duration of the accompaniment data with a preset playback duration; and normalize the accompaniment data, to match a sound intensity of the accompaniment data with a preset sound intensity.

* * * * *